United States Patent [19]

Schwerdt

[11] Patent Number: 4,936,557
[45] Date of Patent: Jun. 26, 1990

[54] HYDRAULICALLY DAMPED RUBBER CARTRIDGE SPRING

[75] Inventor: Hans-Werner Schwerdt, Laudenbach, Fed. Rep. of Germany

[73] Assignee: Firma Carl Freudenberg, Weinheim, Fed. Rep. of Germany

[21] Appl. No.: 286,510

[22] Filed: Dec. 19, 1988

[30] Foreign Application Priority Data

Jan. 13, 1988 [DE] Fed. Rep. of Germany ....... 3800656

[51] Int. Cl.$^5$ ............................................... F16F 13/00
[52] U.S. Cl. .................... 267/141.2; 267/140.1; 267/219
[58] Field of Search ................. 267/140.1 R, 140.1 A, 267/140.1 C, 140.1 AE, 140.1 E, 219, 35, 152, 153, 141.2, 141.3, 141.4, 141.5; 180/299, 312; 248/636, 638, 560, 562, 565

[56] References Cited

U.S. PATENT DOCUMENTS

| 3,803,853 | 4/1974 | Kuus | 267/153 X |
|---|---|---|---|
| 4,621,795 | 11/1986 | Eberhard et al. | 267/219 X |
| 4,645,189 | 2/1987 | Quast | 267/219 X |
| 4,667,942 | 5/1987 | Bitschkus et al. | 267/140.1 C |
| 4,702,346 | 10/1987 | Uno et al. | 267/140.1 C |

FOREIGN PATENT DOCUMENTS

| 3631620 | 3/1987 | Fed. Rep. of Germany . | |
|---|---|---|---|
| 0014627 | 1/1985 | Japan | 267/140.1 C |
| 0208650 | 10/1985 | Japan | 267/219 |
| 2192968 | 1/1988 | United Kingdom | 267/140.1 C |
| 2207215 | 1/1989 | United Kingdom | 267/140.1 C |

*Primary Examiner*—Andres Kashnikow
*Assistant Examiner*—Matthew C. Graham
*Attorney, Agent, or Firm*—Milde & Robinson

[57] ABSTRACT

A hydraulically damped rubber cartridge spring in which a rubber spring body is surrounded at each lateral end by a permanently vulcanized supporting ring and, in the region between them, by a ring body which consists of two half shells. The ring body and the supporting rings have the same outside diameter and are in contact with the cylindrical inner surface of an outer tube of the device.

14 Claims, 5 Drawing Sheets

HYDRAULICALLY DAMPED RUBBER CARTRIDGE SPRING

BACKGROUND OF THE INVENTION

The invention relates to a hydraulically damping rubber cartridge spring of the type comprising an inner tube, a rigid ring body, an intermediate tube, an outer tube which surrounds and supports the latter elements and a spring body consisting of rubber vulcanized around the inner tube. The spring body forms two chambers situated one behind the other in the direction of the forces applied to the rubber cartridge spring. The chambers are separated by a flexible dividing wall of the spring body and by the ring body in the region of their outer circumference. The end walls are surrounded by and affixed adhesively to the intermediate tube.

A rubber cartridge spring of this type is disclosed in the German Patent Publication No. 36 31 620. The spring body consisting of rubber is fastened externally to an intermediate tube which is pierced with window-like openings in the area of the outside of the chambers and is covered by a full ring body. The production of the intermediate tube is accordingly complex since it is necessary to use separately made sealing rings to achieve a good seal with respect to the outer tube. From the economic point of view this is not very satisfactory. Also, the dividing wall is subjected to a permanent tension bias due to the shrinkage produced by vulcanization. This bias can lead to an impairment of the useful life of the spring.

SUMMARY OF THE INVENTION

It is an object of the present invention to further develop a rubber cartridge spring of the type described above in which the number of components is reduced and the useful life is improved.

This object as well as other objects which will become apparent in the discussion that follows, are achieved, in a rubber cartridge spring of the type described above and in accordance with the present invention, by producing the intermediate tube of two axially separate supporting rings which, in their axial length, are each limited to the region of the corresponding end wall of the device. Production is accordingly simplified and can be implemented by cutting the rings from tubular material on an automatic lathe.

In addition, the ring body is divided lengthwise and consists of two half-shells which are inserted into the axial space between the two supporting rings, and which have an outside diameter that is the same as that of the supporting rings. The assembly of the individual parts in the rubber cartridge spring is thus simplified, and their seal with respect to each other is improved.

Furthermore, the half shells are provided with supporting surface of a U-shaped profile, extending parallel to the dividing wall, which surround the dividing wall in the area of their ends and which project toward the outer tube. The surfaces in contact with one another are configured such that, in the case of any relative displacement of the inner tube with respect to the outer tube, at least a continuous line contact results between the supporting surfaces and the dividing wall. This assures a sufficient mutual sealing against one another and assures the achievement of good damping action.

This damping action is based exclusively on the effects which result upon the transfer of liquid from the chamber of the higher pressure to the chamber of lower pressure in a connecting passage provided precisely for this purpose. Depending upon the application, the connecting passage can be configured as a simple throttle opening, but if necessary it can also be channel-like and be disposed, if desired, in the region of the outer circumference of the ring body.

In the rubber cartridge spring in accordance with the invention the dividing wall is connected to the outer tube at its radial outer ends, not by adhesion, but by enveloping it on three sides by a recess in the divided ring body. In this manner the dividing wall, depending on the particular application, can be biased either in the loading direction, radially in the direction of the inner tube, or also in both directions simultaneously. If, for example, the ring body is pressed with undersize onto the radially outwardly facing surfaces of the dividing wall ends, there will result a compressive bias in the dividing wall whereby the dividing wall will offer greater resistance to flexure. The resilient flexure of the rubber cartridge spring is accordingly reduced.

If a clearance is present between the radially outer surfaces of the dividing wall and the corresponding inside diameter of the recess in the ring body, then upon application of force in the vertical direction at the ends of the dividing wall, there will be no immediate force reaction transversely to the direction of the applied forces.

In this case the ends of the dividing wall are supported only by the bottom surfaces of the recesses of the ring body.

If the ends of the dividing wall form together an angle of less than 180 degrees, the result will be a displacement of the dividing wall ends radially outwardly as flexing progresses. The values involved can be so great that the clearance is closed and, as flexing continues further, contact will be made between the dividing wall ends and the radially inwardly facing supporting surfaces of the ring body. The resilient yielding of the rubber cartridge spring is then increased accordingly.

The transverse mobility of the inner tube with respect to the outer tube can be varied by a clearance present in the above mentioned region or by compression between the outer ends of the dividing wall and the radially inward-facing supporting surfaces. If, for example, the two confronting ends of the dividing wall are given an asymmetrical profile, the result will be an asymmetrical relative mobility between the two parts in question.

The position of the supporting surfaces on the ring body can be displaced in the direction of force application or in the direction contrary thereto.

If the supporting surfaces are relatively displaced contrary to the direction of the applied force, a flexural bias will be produced in the dividing wall that is opposed to the tension in the end walls.

If the position of the supporting surfaces of the ring body is, however, relatively displaced in the direction of the applied force, then the dividing wall, with respect to the end walls, is biased negatively. The rubber cartridge spring, when in use, is accordingly characterized by especially soft elastic resilience.

The total flexural elasticity available can thus be adapted very precisely to special requirement of an application by one or more of the above described measures.

By disposing a stiffening element, such as a tube or a ball, in the dividing wall, an additional stiffening of the dividing wall can be achieved. If the stiffening element is inserted, for example, radially adjacent to the U-shaped supporting surfaces of the ring body so that the radially outermost boundary line of the stiffening element and the radially inner most boundary line of the U-shaped recess are at the same distance from the center of the rubber cartridge spring, then, when the dividing wall flexes, the stiffening element will thrust against the ring body. Thus, the points of support of the dividing wall are displaced radially to the central axis of the rubber cartridge spring, which results in a progressive increase of force as the inner tube is moved with respect to the outer tube.

By inserting a bore in the dividing wall, extending parallel to the axis of the rubber cartridge spring, a portion of the dividing wall can be provided with greater elasticity.

If such a bore is disposed in the vicinity of an outer side of the dividing wall, then this area of the dividing wall will deform upon the introduction of vibrations into the rubber cartridge spring even upon a slight pressure rise in the liquid-filled chamber, without affecting the deformation of the rest of the elastic boundary walls of the chamber.

By constructing the dividing wall in the manner described above, and by supporting the ends of the dividing wall in U-shaped supporting surfaces in the ring body, it is possible in an ideal manner to use the ring body both for the radially outer boundary of the liquid-filled chambers and for an axial, mutual support of the two supporting rings of the intermediate tube. Furthermore, the supporting rings and the ring body are subjected to a precise mutual association with one another within the cylindrical inner surface of the outer tube.

By providing at least one circumferential passage on the radially outwardly facing side of the ring body and a connecting passage for each of the liquid-filled chambers, a low-cost throttling passage is created which makes it possible with the minimium manufacturing expense to implement the hydraulic damping. The passage, like the two chambers, is filled with liquid in the ready-to-use rubber cartridge spring. The outer tube of the rubber cartridge spring envelops the supporting rings and the ring body together and seals them externally.

The half-shells forming the ring body are supported by the outer tube in the rubber cartridge spring according to the invention. This outer tube is preferably made of metal. The half shells can therefore be produced from plastic, if necessary, and can consist, for example, of molded plastic parts. The dividing line between them is best situated within he circumference of the U-shaped profile of the supporting surfaces, so as to facilitate assembling the individual parts together during manufacture.

The preferred embodiments of the invention will now be described with the aid of the accompanying drawings.

DESCRIPTION OF THE PREFERRED EMBODIMENTS

Figure 1:
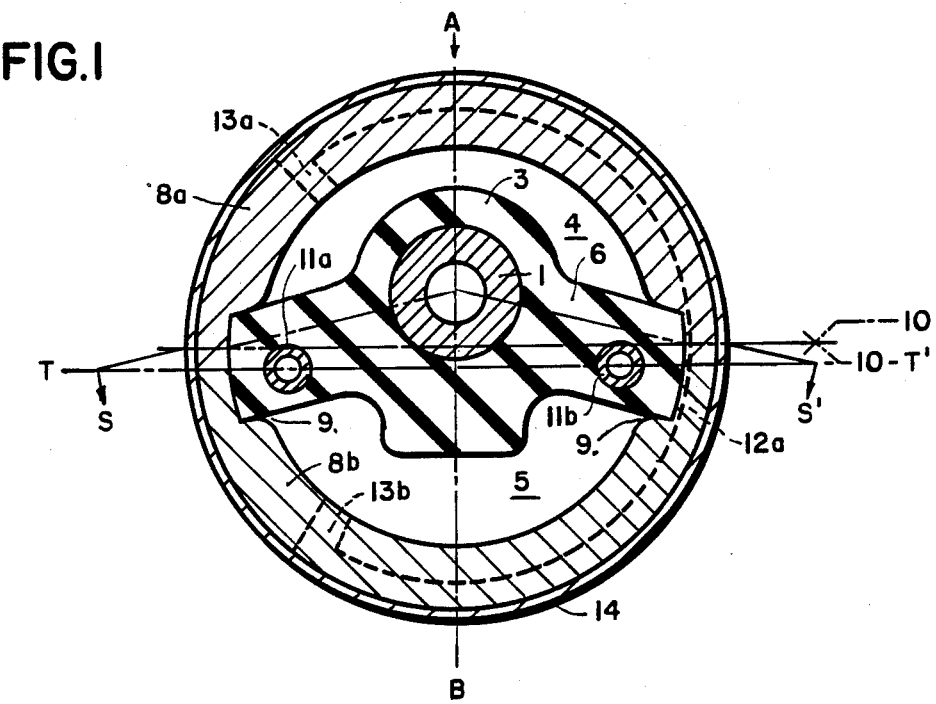
FIG. 1 is a cross sectional view of a rubber cartridge spring according to a first preferred embodiment of the invention.
Figure 2:
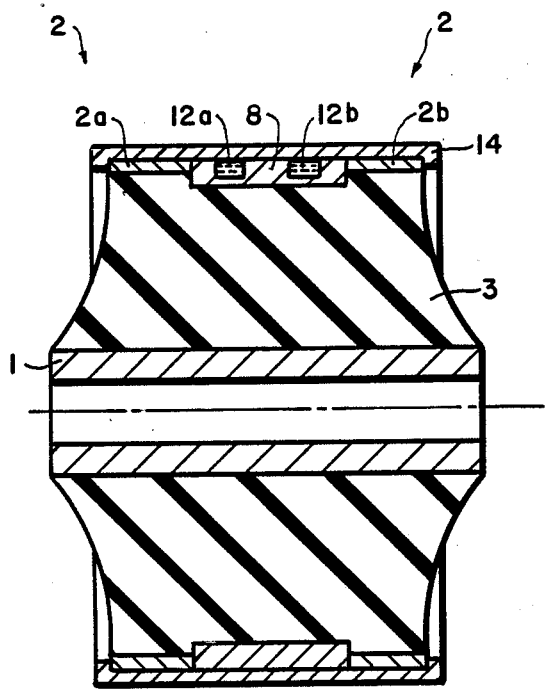
FIG. 2 is a longitudinal sectional view of the rubber cartridge spring of FIG. 1, taken along the section line S—S' in FIG. 1.
Figure 2A:
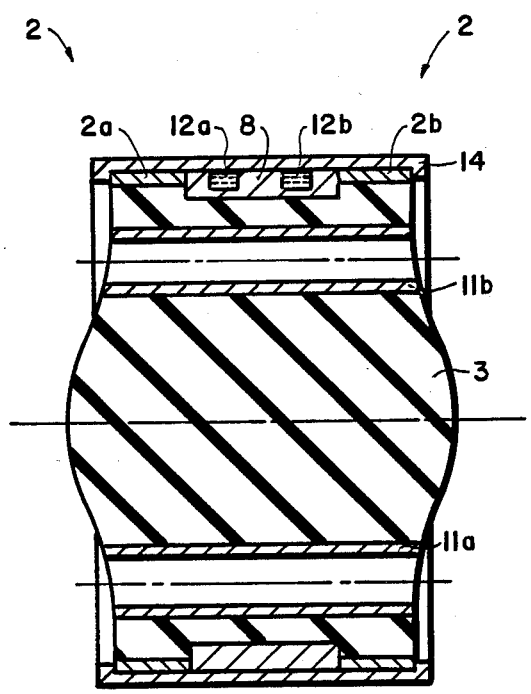
FIG. 2a is a longitudinal sectional view of the rubber cartridge spring of FIG. 1, taken along the section line T—T' in FIG. 1.
Figure 3:
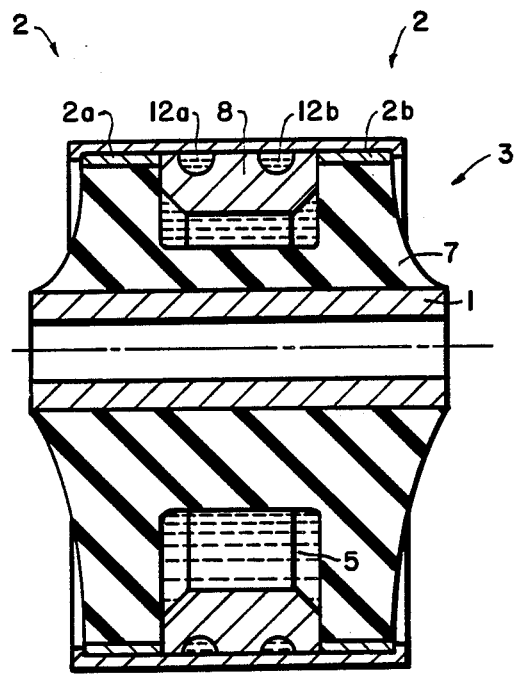
FIG. 3 is a longitudinal sectional view of the rubber cartridge spring of FIG. 1, taken along the section line A—B in FIG. 1.

A first preferred embodiment of the invention, as illustrated in FIGS. 1, 2 and 2a, includes a ring body 8 is formed of two half shells 8a and 8b which meet together at mating surfaces 10. The ends of a dividing wall 6 are enveloped by groove-like recesses in the half-shells and are supported on the surfaces 9 against flexing in direction "A". The two ends of the dividing wall are constructed in a mirror-image relationship about the line "A—B", the included angle indicated by lines S—S' amounting to 120 degrees. This angle can be varied if necessary in a range from 100 to 170 degrees. The central region 3 of the dividing wall surrounds an inner tube 1. Two chambers 4 and 5 are formed on opposite sides of the dividing wall 6 by the half shells 8a and 8b of the ring body 8. The half shells and the entire assembly is surrounded and held together by an outer tube 14.

The rubber cartridge spring of FIGS. 1, 2, 2a and 3 functions as follows: Upon application of a force to the inner tube 1 in direction "A", the dividing wall, as supported on the supporting surfaces of the ring body, flexes. As flexing continues, a continuous increase in the reaction force takes place, until the ends of the dividing wall enclose an angle of about 180 degrees. If the flexing continues further, there is no further increase in reaction force, but the level of the force remains constant.

If the working point of the rubber cartridge spring is selected such that it is reached when the limbs of the dividing wall enclose an angle of 180 degrees, an elastic yielding of the rubber cartridge spring can be achieved without an increase in force.

The radially outer diameter of the dividing wall 6 can be made greater than the corresponding diameter of the grooves in the half shells 8a, 8b, resulting in a radial compression of the dividing wall 6 during assembly.

The tubes 11a, 11b, disposed in the dividing wall 6 have a stiffening effect on the dividing wall with respect to radial compression, without resulting in an equivalent loss of the flexural elasticity. The magnitude of the stiffening effect can be adjusted by varying the diameter of the tubes 11a, 11b, and by varying their distance from the inner tube 1.

Figure 4:
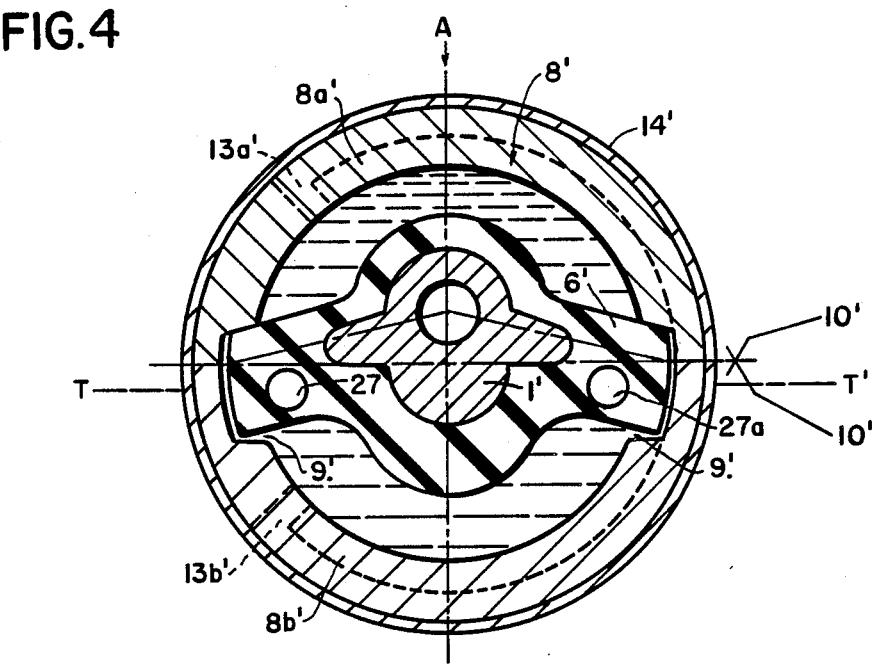
FIG. 4 is a cross sectional view of a second preferred embodiment of a rubber cartridge spring according to the invention.

If instead of the additional tubes 11a, 11b, bores 27, 27a, are provided in the dividing wall, as shown in FIG. 4, then the flexing of the dividing wall is facilitated and the force-versus-distance relationship of the rubber cartridge spring is given a flatter characteristic.

Figure 4A:
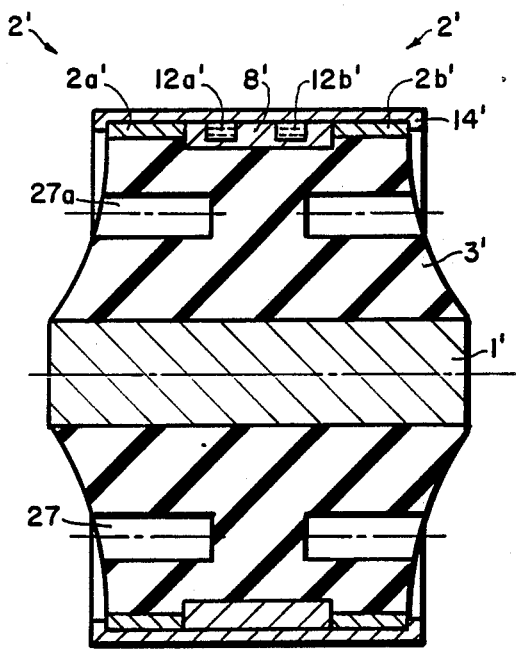
FIG. 4a is a longitudinal sectional view of the rubber cartridge spring of FIG. 4, taken along the section line T—T' in FIG. 4.

FIGS. 4 and 4a illustrate a second preferred embodiment of the rubber cartridge spring in accordance with the present invention. Individual elements of this second embodiment which are identical or similar to the elements of the first embodiment, as illustrated in FIGS. 1, 2, 2a and 3, are designated with the same reference numerals; however, the reference numerals in FIGS. 4 and 4a are primed to distinguish the two embodiments. In this case the ring body 8' is not pressed onto the radially outer diameter of the dividing wall 6', but the ends of the dividing wall have a radial clearance in the recess of the ring body. Additional clearance is present between the bearing surface of the dividing wall 6' and the supporting surface 9' in the recess in the divided ring body 8'. Moreover, both surfaces from an angle with respect to each other, with the result that the contact between them is present at first only in a linear area and, as relative movement of the inner tube 1' with respect to the outer tube 14' progresses, the contact region is widened to a broad bearing zone.

Figure 5:
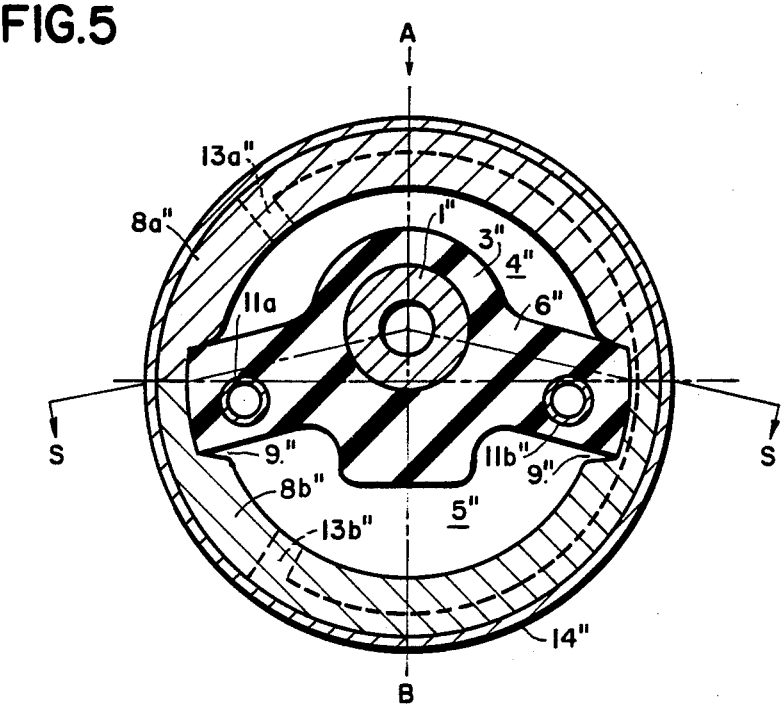
FIG. 5 is a cross sectional view of a rubber cartridge spring according to a third preferred embodiment of the present invention.

FIG. 5 illustrates a third embodiment of the invention. The various elements of this embodiment are designated with the same reference numerals as the identical elements of the first two embodiments, except that they are double primed to distinguish them from the first and second embodiments. This third embodiment is identical to the first embodiment as illustrated in FIG. 1, with the exception that additional clearance is provided between the bearing surface of the dividing wall 6" and the supporting surface 9" in the recess of the divided ring body 8", as in the case of the second embodiment as illustrated in FIG. 4.

Both the radial clearance and the bearing clearance bring about the result that, when the flexure of the dividing wall begins in direction "A", the force increase is at first very slight. The stiffening strips present on the inner tube 1' and projecting into the dividing wall produce an overall increase in its stiffness, thereby substantially improving the pumping capacity of the embodiment in FIGS. 4 and 4a in comparison to the rubber cartridge spring construction according to FIGS. 1, 2, 2a and 3. The throttling passage connecting the two chambers can thus be substantially lengthened without any impairment of the damping action.

FIGS. 2, 2a, 3 and 4a show that the divided ring body 8, in addition to its purpose of supporting the dividing wall 6 radially at both ends, also completely encloses the circumference of the chambers 4 and 5 and produces an ideal mutual axial support of the two supporting rings 2a, 2b. The throttling passages 12a, 12b, in the form of two parallel channels, are formed in the outer circumference of the ring body and communicate with the chambers 4 and 5 through the connecting orifices 13a, 13b. The passages 12a, 12b are, like the entire rubber cartridge spring, sealingly closed by the outer tube 14 in a simple and effective manner by crimping the axial ends of the outer tube radially inwardly.

There has thus been shown and described a novel hydraulically damped rubber cartridge spring which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention which is limited only by the claims which follow.

What is claimed is:

1. In a hydraulically damping rubber cartridge spring comprising an inner tube; a rigid ring body; an intermediate tube; an outer tube which surrounds and supports the latter elements; and a spring body consisting of rubber vulcanized around the inner tube, said spring body forming two chambers situated one behind the other in the direction of the forces to be applied, the chambers being separated by a flexible dividing wall of said spring body and bounded on opposite sides by flexible end walls of said spring body and by said ring body in the region of their outer circumference, said flexible end walls being surrounded by and affixed adhesively to said intermediate tube; the improvement wherein said intermediate tube comprises two axially separated supporting rings which are limited in extent in their axial direction to the regions surrounding said flexible end walls; wherein said ring body comprises two half shells arranged in the axial space between said two supporting rings and has an outside diameter that is the same as that of said supporting rings; wherein said half shells are provided with supporting surfaces of U-shaped profile extending parallel to said dividing wall; and wherein said supporting surfaces of U-shaped profile envelop said dividing wall in the region of its ends on both lateral sides and in the circumferential direction.

2. The rubber cartridge spring in accordance with claim 1, wherein the inner surface of said outer tube is cylindrical, and wherein said supporting rings and said ring body contact said said inner surface of the outer tube with a press fit.

3. The rubber cartridge spring in accordance with claim 1, wherein clearance is provided between said supporting surfaces and the outer ends of said dividing wall.

4. The rubber cartridge spring in accordance with claim 1, wherein said supporting surfaces contact the outer ends of said dividing wall with a resilient bias.

5. The rubber cartridge spring in accordance with claim 1, wherein said supporting surfaces contact the outer ends of said dividing wall in the radial direction with resilient bias, and are spaced away from it in the circumferential direction.

6. The rubber cartridge spring in accordance with claim 1, wherein said supporting surfaces merge smoothly into the cylindrical inner surface of said ring body.

7. The rubber cartridge spring in accordance with claim 1, wherein said supporting surfaces are formed by the boundary surfaces of grooves in each of said half shells.

8. The rubber cartridge spring in accordance with claim 1, wherein said half shells are plastic moldings.

9. The rubber cartridge spring in accordance with claim 1, wherein said dividing wall is provided with stiffening means which extend parallel to said supporting surfaces.

10. The rubber cartridge spring in accordance with claim 9, wherein said stiffening means include a flexure-resistant, rod-like supporting element which is disposed near the center of said dividing wall.

11. The rubber cartridge spring in accordance with claim 9, wherein said stiffening means and said dividing wall are fixedly joined together.

12. The rubber cartridge spring in accordance with claim 9, wherein said stiffening means include a flexure-resistant, rod-like supporting element which is disposed in said dividing wall.

13. The rubber cartridge spring in accordance with claim 12, wherein said supporting element and said inner tube are a single piece.

14. The rubber cartridge spring in accordance with claim 12, wherein said supporting element is disposed in an opening in said dividing wall which extends parallel to the axis of said outer tube.

* * * * *